US010600091B2

(12) United States Patent
Owens et al.

(10) Patent No.: US 10,600,091 B2
(45) Date of Patent: Mar. 24, 2020

(54) SYSTEMS AND METHODS FOR VIEW-BASED ADVERTISEMENT SELECTION

(71) Applicant: PREDICT INTERACTIVE, INC., Wichita, KS (US)

(72) Inventors: Kevin Owens, Wichita, KS (US); Taewook Kang, Wichita, KS (US); Grant Gillespie, Wichita, KS (US)

(73) Assignee: PREDICT INTERACTIVE, INC., Wichita, KS (US)

( * ) Notice: Subject to any disclaimer, the term of this patent is extended or adjusted under 35 U.S.C. 154(b) by 381 days.

(21) Appl. No.: 15/585,752

(22) Filed: May 3, 2017

(65) Prior Publication Data
US 2017/0323351 A1    Nov. 9, 2017

Related U.S. Application Data

(60) Provisional application No. 62/332,049, filed on May 5, 2016.

(51) Int. Cl.
*G06Q 30/00* (2012.01)
*G06Q 30/02* (2012.01)
*H04L 29/08* (2006.01)

(52) U.S. Cl.
CPC ......... *G06Q 30/0277* (2013.01); *H04L 67/02* (2013.01)

(58) Field of Classification Search
None
See application file for complete search history.

(56) References Cited

U.S. PATENT DOCUMENTS

| 9,317,868 | B2 * | 4/2016 | Jager | G06F 16/986 |
| 10,242,119 | B1 * | 3/2019 | Karppanen | G06T 11/60 |
| 2003/0182184 | A1 * | 9/2003 | Strasnick | G06Q 30/02 705/14.66 |
| 2011/0082755 | A1 * | 4/2011 | Itzhak | G06Q 30/02 705/14.69 |
| 2011/0115883 | A1 * | 5/2011 | Kellerman | G06F 3/012 348/46 |
| 2013/0050249 | A1 * | 2/2013 | Grabowski | G06T 15/40 345/619 |
| 2014/0281901 | A1 * | 9/2014 | Mostowy | G06F 16/9577 715/234 |

(Continued)

FOREIGN PATENT DOCUMENTS

WO    2016016904 A1    2/2016

OTHER PUBLICATIONS

International Search Report and Written Opinion dated Jul. 6, 2017 in related International Application No. PCT/US2017/029590.

*Primary Examiner* — Matthew T Sittner
(74) *Attorney, Agent, or Firm* — FisherBroyles LLP; Keats A. Quinalty

(57) ABSTRACT

Systems and methods for view-based advertisement selection involve controlling the rotation of reproduced advertisements based, in part, on whether the reproduced advertisements are within a browser viewport. An advertisement that is reproduced on a web page and is not within a browser viewport can continue to be reproduced until the advertisement is within the browser viewport for a period of time. After an advertisement is within the browser viewport for a period of time another advertisement is selected to replace the previously reproduced advertisement.

12 Claims, 7 Drawing Sheets

(56) References Cited

U.S. PATENT DOCUMENTS

| | | | |
|---|---|---|---|
| 2015/0051969 A1* | 2/2015 | Jager | G06F 16/986 705/14.45 |
| 2015/0088968 A1* | 3/2015 | Wei | H04L 67/02 709/203 |
| 2015/0186344 A1* | 7/2015 | Leventhal | G06F 40/106 715/238 |
| 2017/0323351 A1* | 11/2017 | Owens | H04L 67/02 |

* cited by examiner

SYSTEMS AND METHODS FOR VIEW-BASED ADVERTISEMENT SELECTION

CROSS-REFERENCE TO RELATED APPLICATIONS

This application claims priority under 35 U.S.C. § 119 to U.S. Provisional Application No. 62/332,049, filed May 5, 2016, the entire disclosure of which is herein expressly incorporated by reference.

BACKGROUND OF THE INVENTION

Exemplary embodiments of the present invention are directed to systems and methods for view-based advertisement selection.

Advertisements have been and continue to be integral to the Internet as one of the primary mechanisms for monetizing web sites. Due to the technological nature of the Internet web-based advertisements are significantly different from regular advertisements. For example, paper-based magazine advertisements are selected for particular magazines based on demographic information about the magazine's subscribers. In many instances this demographic information is limited to the mailing address to which the magazine is sent. In contrast, Internet-based advertisements can take advantage of cookies, which are placed on users' computers to track the users' browsing behavior. Thus, using information stored in a cookie an Internet-based advertisement can be more particularly targeted than in conventional, non-Internet-based advertisements.

The format of Internet-based advertisements has evolved over time. Initially many Internet-based advertisements were in the form of banner advertisements placed on the top of a web page. In order to grab a user's attention the typical static banner advertisements were replaced with dynamic advertisements, such as flashing banner advertisements. Due to concerns that user's were not paying attention to banner advertisements placed on the top of a web page pop-over and pop-under advertisements, in which the advertisement either appeared over or behind the desired web page, were developed to ensure that the advertisement is seen by the user.

Pricing Internet-based advertisements is typically based on two factors, the popularity of the web site/web page on which the advertisement is placed and whether the advertisement results in a user clicking the advertisement to obtain more information regarding the product or service that is the subject of the advertisement.

SUMMARY OF THE INVENTION

It has been recognized that certain types of advertisements encounter particular problems due to the manner in which web pages are reproduced that are not encountered with non-Internet based advertisements. Specifically, rotating advertisements that periodically change over time encounter significantly different issues than similar non-Internet based advertisements. For example, it is now increasingly common to place video screens in public places that periodically change advertisements over time. For these types of advertisements the advertiser is paying for the location where the video screen will be placed so that video screens in higher traffic areas command higher rates than those in lower traffic areas. Regardless of where these video screens are placed, the advertisements that are in a reproduction rotation will each be reproduced for a predetermined amount of time and will be visible to anyone passing by the video screen during the predetermined amount of time.

In contrast, the content of web pages typically exceed the viewable area of the browser on which the web pages are reproduced, an area commonly referred to as the viewport. Thus, Internet-based rotating advertisements are typically reproduced for a predetermined amount of time regardless of whether the advertisements are within the browser's viewport, and thus actually viewable by a user. When at least some or all of an advertisement is not viewable it does not serve its purpose and thus an advertiser would not want to pay for an advertisement that is not actually displayed to a user. Further, the rotation of advertisements on a web page increases the likelihood that the user's attention will be drawn to the advertisement because the user sees the change in advertisements as movement. Thus, changing advertisements that are not viewable by a user would not serve this function of drawing the user's attention.

One conventional way to address this problem of Internet-based advertisements, which is also used for static advertisements, is to adjust the position of the advertisement on the web page so that the advertisement is always within the browser's viewport. Thus, as a user scrolls a web page or adjusts the viewing area of the web page (e.g., zooms in or out of the web page) the position of the advertisement is also adjusted to stay within the viewport.

Instead of adjusting the position of the advertisement to stay within the browser's viewport, exemplary embodiments of the present invention address the above-identified and other deficiencies of conventional advertisement reproduction technology by controlling the rotation timing of advertisements based, in part, on whether the advertisement is within the browser's viewport. Thus, when the advertisement is not within the browser's viewport the advertisements are not rotated within the advertisement space. Accordingly, exemplary embodiments of the present invention are directed to a solution that is necessarily rooted in computer technology to overcome a problem specifically arising in the realm of computer networks.

According to one embodiment of the invention a method comprises a web browser being executed on a processor receiving code corresponding to a requested web page and executing the received code to reproduce the requested web page. A portion of the requested web page within a viewport of the web browser is displayed. A plug-in of the web browser, executes a plug-in script in the received code. Execution of the plug-in script by the plug-in comprises selecting an advertisement from an advertisement queue; reproducing the selected advertisement in an advertisement space on a portion of the web page; and determining whether the advertisement space is within the viewport of the web browser, whereby the advertisement space is displayed on the webpage when it is within the viewport of the web browser. When a predetermined portion of the advertisement space is not within the viewport of the web browser, the plug-in waits for a viewing area change event, determines whether the viewing area change event caused the predetermined portion of the advertisement space to be within the viewport of the web browser, and selects another advertisement from the advertisement queue when the viewing area change event caused the predetermined portion of the advertisement space to be within the viewport of the web browser.

According to another embodiment of the invention a method comprises a web browser being executed on a processor receiving code corresponding to a requested web page and rendering the web page based on the received code. The rendered web page includes a portion that is within a viewport of the web browser and a portion that is outside of the viewport of the browser. The web browser renders an advertisement selected from an advertisement queue in an advertisement space on the web page and at least the portion of the rendered webpage is displayed within the viewport of the web browser. The web browser selects and renders another advertisement in the advertisement space on the rendered web page when a predetermined amount of the advertisement space is within the web browser viewport, and thereby displayed, for a predetermined amount of time.

Other embodiments of the invention are directed to systems and apparatus for performing these and other disclosed methods, as well as non-transitory computer-readable medium storing instructions, which when executed by a processor, cause the processor to perform one of the disclosed methods.

BRIEF DESCRIPTION OF THE DRAWING FIGURES

DETAILED DESCRIPTION

Exemplary embodiments are directed to controlling the rotation timing of advertisements based, in part, on whether the advertisement is within the browser's viewport. It will be recognized that placement of an advertisement on a web page is, in some instances, a decision made by the owner/operator of the website instead of being made by the advertiser or advertising agency. Thus, a website owner/operator may use code to place an advertisement in a static location on the web page that does not account for the actual visibility of the advertisement. For example, an advertisement may be statically placed at the bottom of particular web page assuming that the advertisement will be viewable on the web page. However, devices with lower resolutions than are accounted for by the website owner/operator may not be within the browser's viewport without scrolling and/or resizing the web page on the lower resolution display of the device. In other situations the content of the web page is greater than the viewport of a browser even for devices having a very high resolution display, and thus an advertisement placed in a lower portion of the web page may not be viewable without scrolling and/or resizing the web page. Thus, exemplary embodiments of the present invention are particularly useful in controlling the rotation of advertisements so that the advertisements are rotated only when the advertisements are within a particular browser's viewport.

Prior to describing the invention in detail, the definition of several terms used throughout the application is provided for a better understanding of the invention. As discussed above, elements reproduced on a web page may or may not be currently viewable by a user. Thus, in the discussion below references to reproducing or rendering include both viewable and non-viewable reproductions and renderings. The terms reproduce and render are used interchangeably in the application to mean reproducing a web page based on code. References to being in view or within the viewport means that at least a user of the browser can currently see a portion of the element. Further, although exemplary embodiments are described in connection with a Java-based plug-in, the present invention can be used with any other type of plug-in that can execute the functionality described below.

Figure 1A:
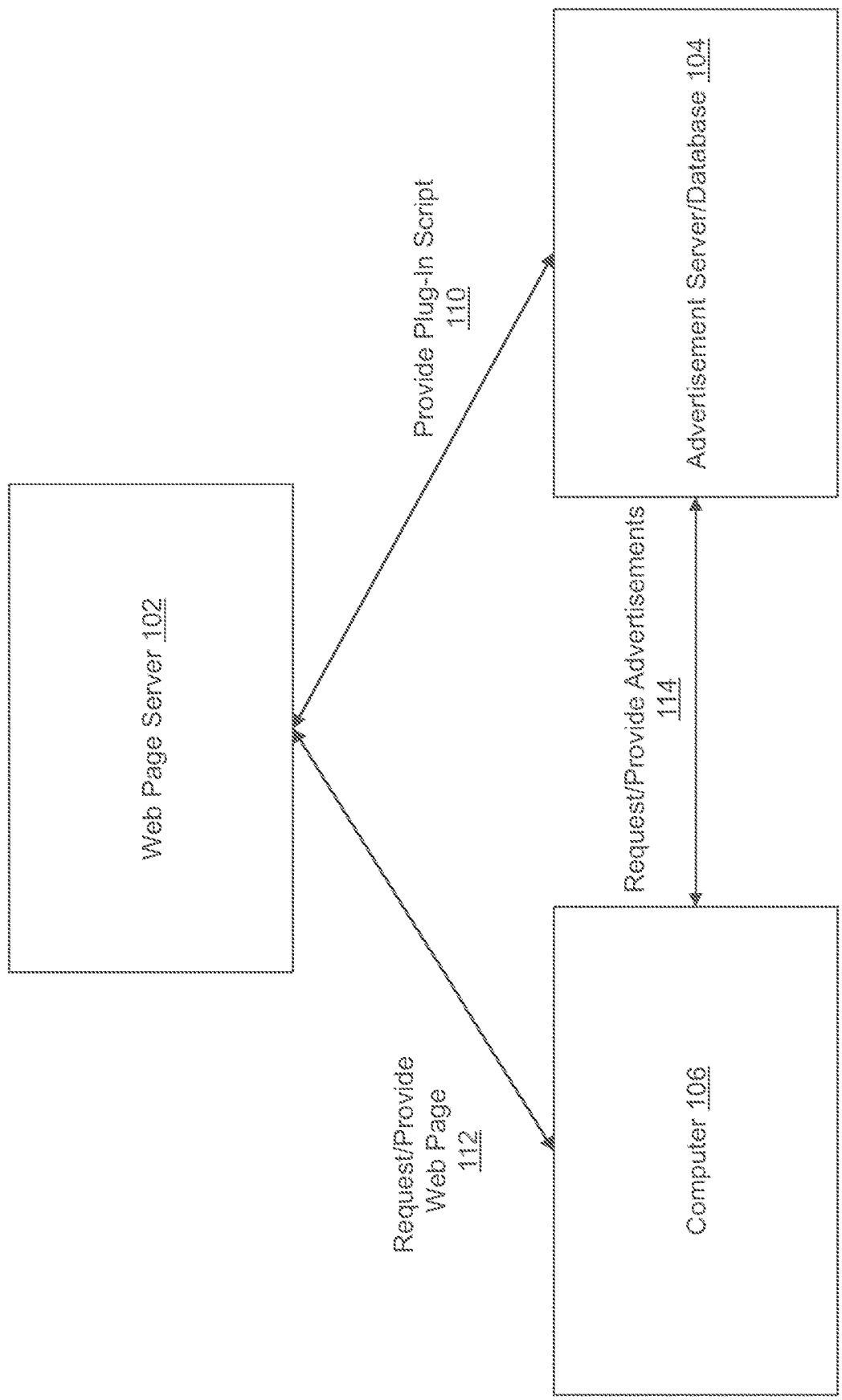
FIG. 1A is a block diagram of an exemplary system in accordance with the present invention.

FIG. 1A is a block diagram of an exemplary system in accordance with the present invention. The system includes a web page server 102, which communicates with an advertisement server/database 104 and computer 106. As detailed below, the advertisement server/database 104 provides a plug-in script to server 102 (step 110) so that the plug-in script is included on one or more web pages provided by web page server 102. Accordingly, when computer 106 requests a web page from web page server 102, the provided web page includes the plug-in script (step 112). The plug-in script then requests advertisements for an advertisement queue from advertisement server/database 104, which provides the advertisements (step 114), which are then reproduced by computer 106 on the web page.

Figure 1B:
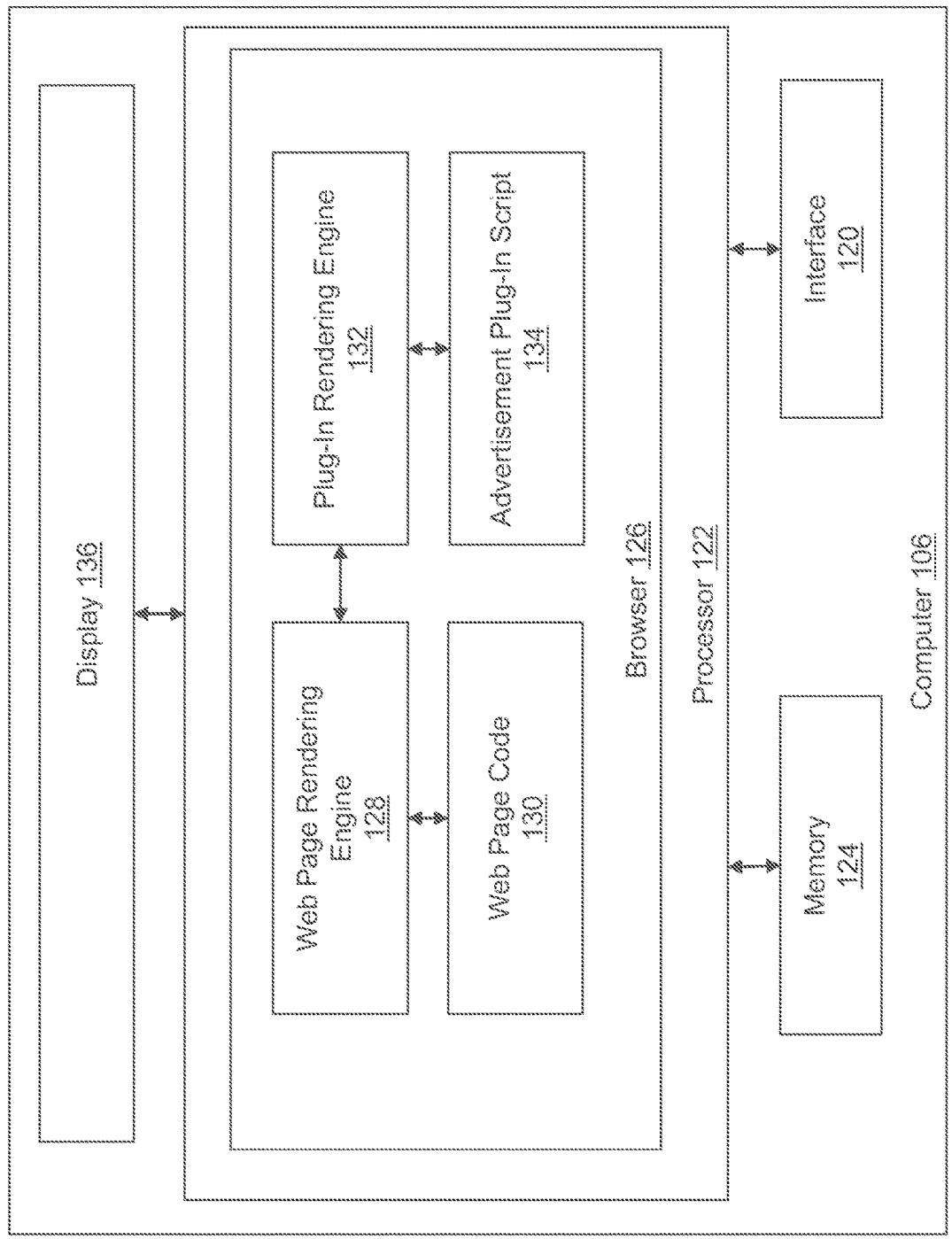
FIG. 1B is a block diagram of an exemplary computer in accordance with the present invention.

FIG. 1B is a block diagram of an exemplary computer 106 in accordance with the present invention. The present invention can be implemented on any type of device that is capable of reproducing web pages, and thus the term computer should be understood as including any device having such a capability, including desktop computers, laptop computers, smart phones, tablets, wearable computers, smart watches, and the like. Computer 106 includes one or more interfaces 120 for communicating with web page server 102 and/or advertisement server/database 104, which can be any type of wireless and/or wired interface. Interface 120 is coupled to processor 122, which is coupled to one or more memories 124 in order to execute applications and render/reproduce web pages. Processor 122 can be any type of processor, including a microprocessor, field programmable gate array (FPGA), application specific integrated circuit (ASIC), and/or the like. Memory 124 can include any type of memory, including random access memory (RAM), read-only memory (ROM), a solid state hard drive (SSD), a spinning hard drive, and/or the like. Further, some of the memory 124 can be external to the computer 106.

Using computer code loaded from memory 124, processor 122 executes a browser 126. Specifically, browser 126 includes a web page rendering engine 128, which executes web page code 130, typically in the form of HTML, obtained from a web page server. In addition, the browser may also include one or more plug-in rendering engines 132, which can execute an advertisement plug-in script 134. Non-limiting examples of plug-in rendering engines include Oracle's Java, Adobe's Flash, and Apple's QuickTime player. Thus, processor 122, using browser 126, provides a rendered web page, including any rendered plug-ins, to display 136 as an output for a user. Although display 136 is illustrated as being part of computer 106, the display can be an external component, depending upon the type of computer.

The web page rendered by browser 126 typically will include portions that are visible on display 136, as well as portions that are not visible. Although portions of the page are not visible, these portions are still rendered by browser 126 so that when the user adjusts the web page on display 136 (e.g., reduces the size of the reproduced web page and/or moving the web page up, down, left, and/or right) the non-visible portion is then reproduced on the display.

Figure 2A:
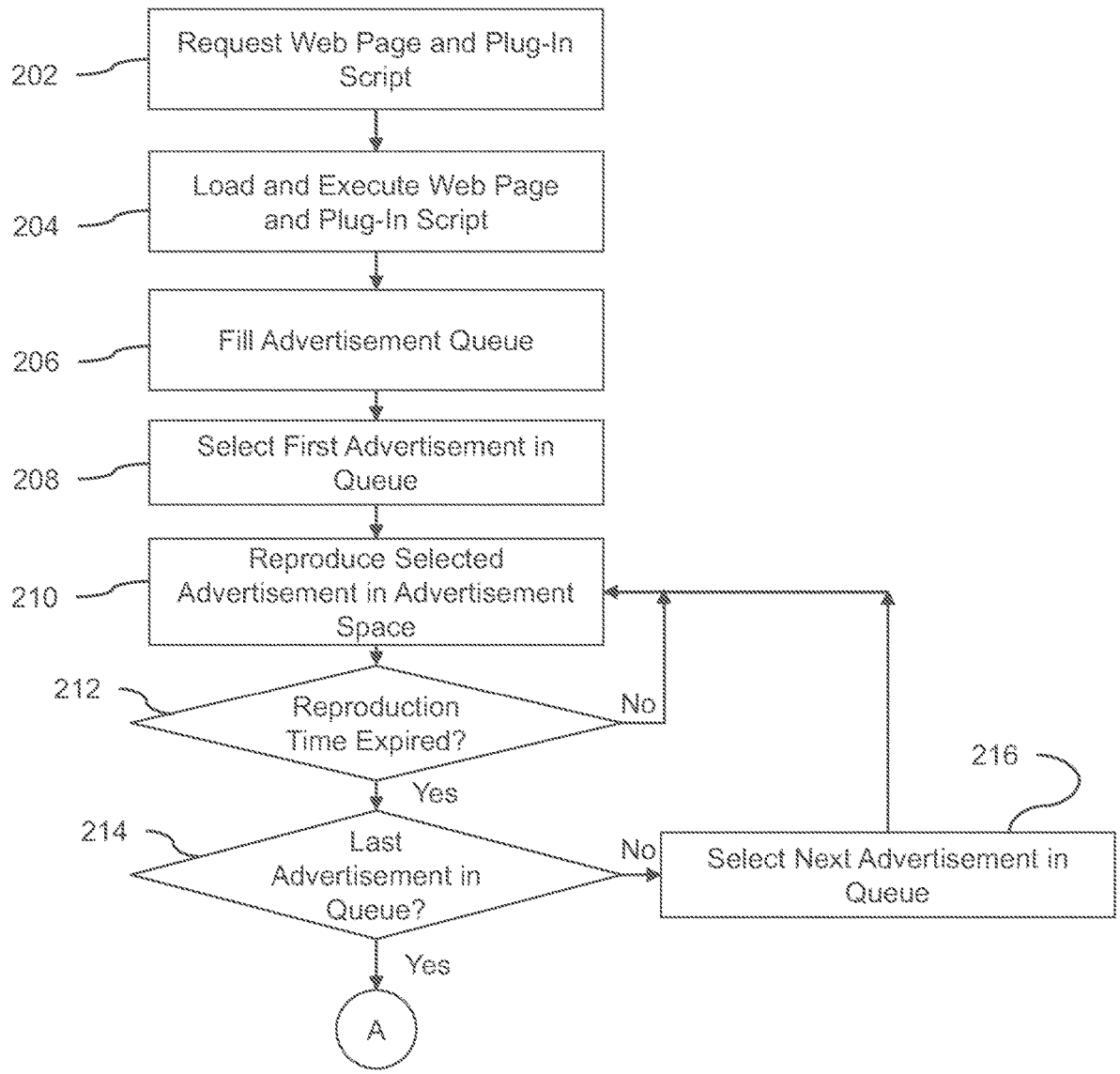
FIGS. 2A and 2B are flow diagrams of an exemplary method for view-based advertisement selection in accordance with the present invention.
Figure 2B:
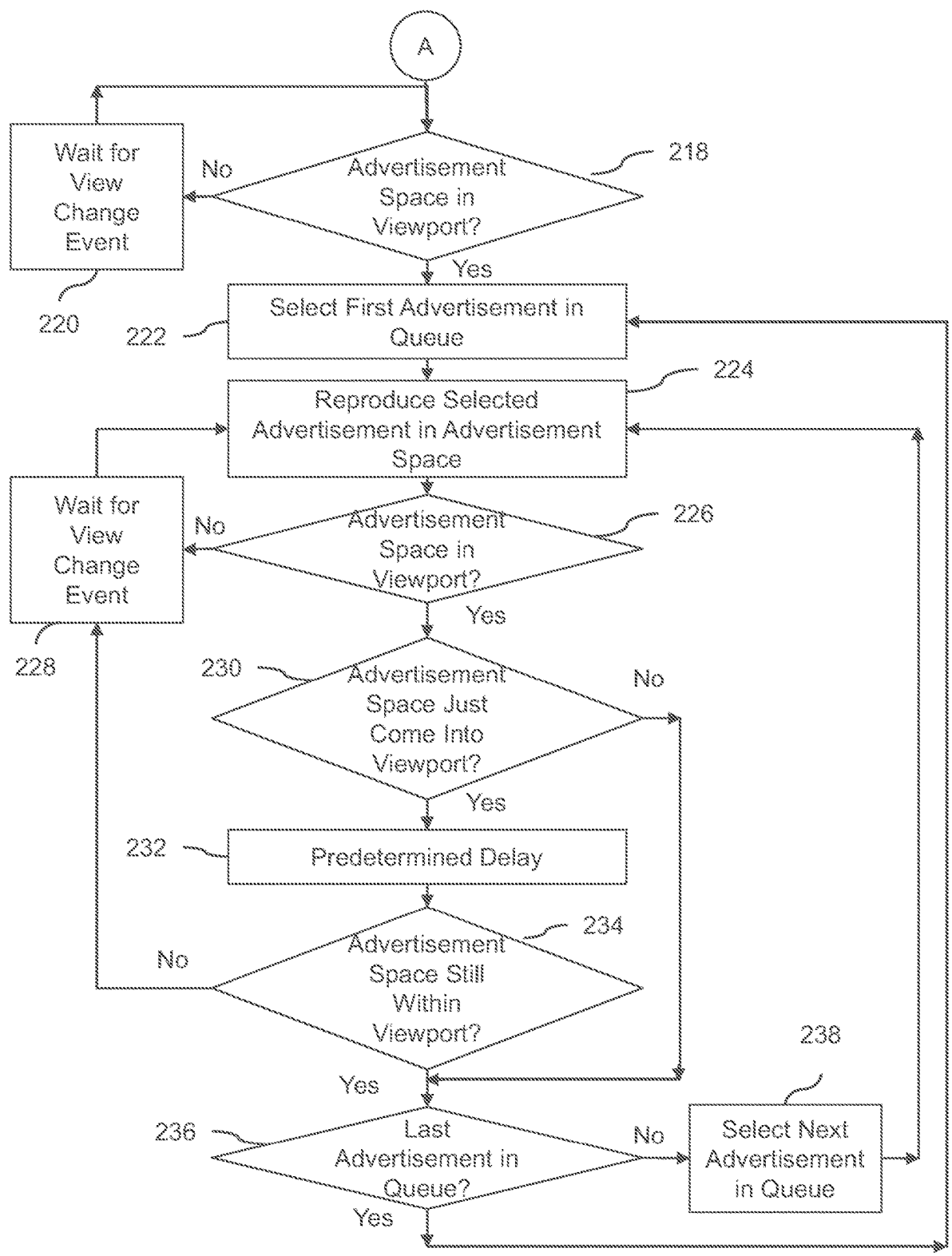

Now that an overview of the system of the present invention has been provided, a description of the method of the present invention will be described in connection with FIGS. 2A-5D. The method of exemplary embodiments of the present invention includes two stages, in the first stage advertisements are reproduced for a predetermined period of time and then changed (FIG. 2A) and in the second stage the advertisements are reproduced based on both the passage of time and whether the advertisement is actually viewable, i.e., within the browser's viewport (FIG. 2B). Thus, in the first stage advertisements are changed within the advertisement space regardless of whether the advertisements are viewable. It should be recognized, however, that the present invention can be implemented without the first stage so that advertisements are changed within the advertisement space based on both the reproduction time and whether the advertisement is viewable during the reproduction time.

Initially, computer 106, using browser 126, requests a web page and plug-in script from web page server 102 (step 202), and the browser 126 loads and executes the web page and plug-in script (step 204). The plug-in script includes a command to obtain advertisements from advertisement server/database 104, and accordingly the plug-in script requests advertisements and fills the advertisement queue with the advertisements received from advertisement server/database 104 (step 206).

Figure 3:
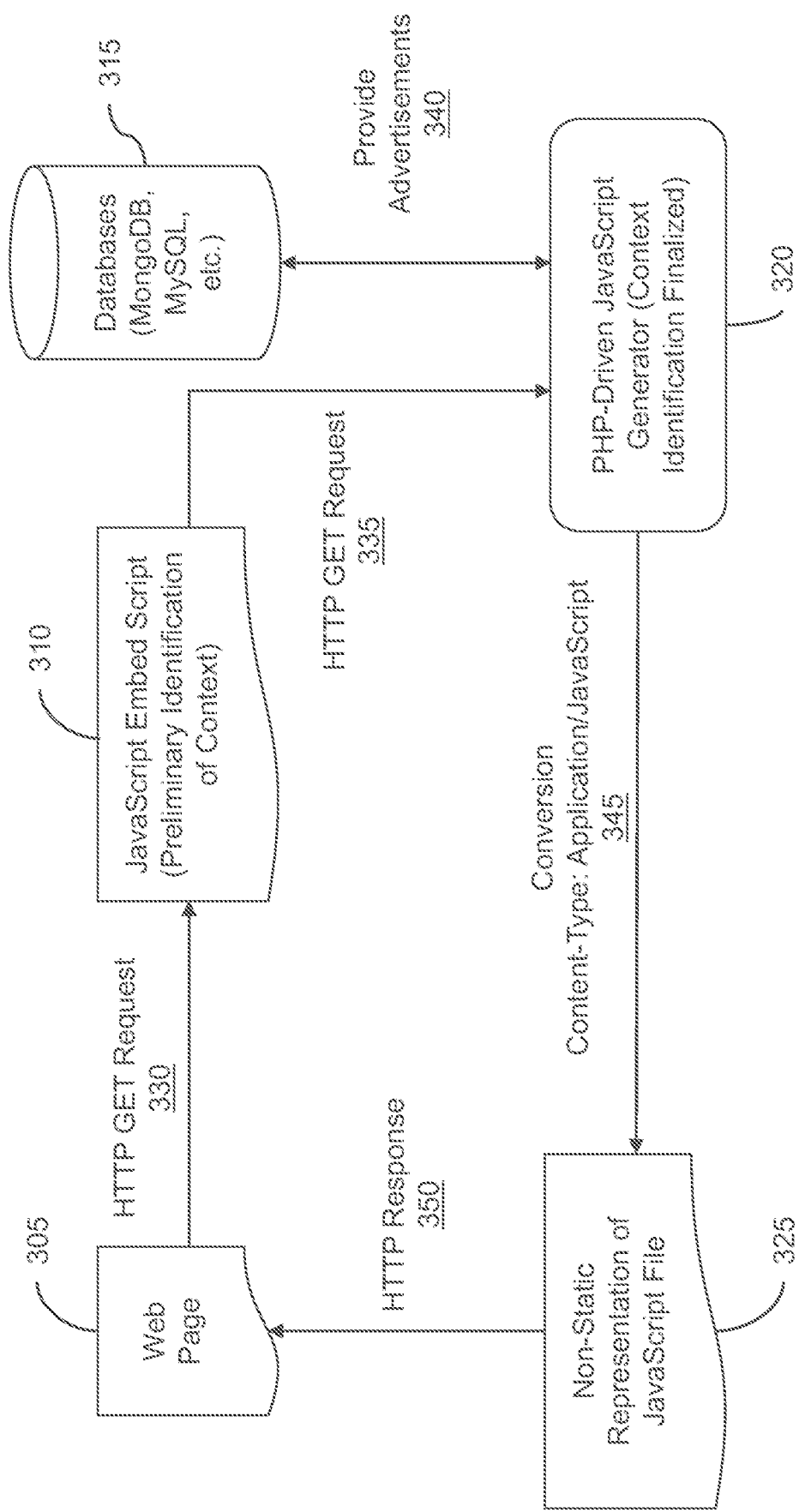
FIG. 3 is a block diagram of an exemplary method for executing an advertisement browser plug-in in accordance with the present invention.

An example of this process is illustrated in FIG. 3. Specifically, the web page 305 issues an HTTP GET Request to the JavaScript embedded script 310 (step 330), which in turn issues the HTTP GET Request to PHP-Driven JavaScript Generator 320 (step 335). PHP-Driven JavaScript Generator 320 also requests advertisements from and is provided advertisements by one or more advertisement databases 315 (step 340). As noted in the figure, JavaScript Embed Script 310 generates a preliminary identification of context and PHP-Driven JavaScript Generator finalizes the context identification. In response to the HTTP Get Request from JavaScript Embed Script 310, PHP-Driven JavaScript Generator issues a conversion command to generate a Non-Static Representation of the JavaScript File 325 (step 345), which representation issues the HTTP Response to the web page 305 (step 350), thus providing the web page with the advertisements that are to be reproduced on the web page.

Returning to FIG. 2A, plug-in rendering engine 132 selects the first advertisement in the queue (step 208) and provides it to web page rendering engine 128 to reproduce the selected advertisement in the designated advertisement space (step 210). Plug-in rendering engine 132 then determines whether the reproduction time has expired (step 212). When the reproduction time has not yet expired ("No" path out of decision step 212), the selected advertisement continues to be reproduced (step 210).

When the reproduction time has expired ("Yes" path out of decision step 212), plug-in rendering engine 132 determines whether the reproduced advertisement is the last advertisement in the queue (step 214). When there are more advertisements in the queue ("No" path out of step 214), plug-in rendering engine 132 selects the next advertisement in the queue (step 216), which is then reproduced in the designated advertisement space for a predetermined amount of time (steps 210 and 212).

When the reproduced advertisement is the last one in the queue ("Yes" path out of decision step 214), then the second stage of the method is performed. Specifically, referring now to FIG. 2B, plug-in rendering engine 132 determines whether the currently reproduced advertisement space is within the viewport of browser 126 (step 218). When the advertisement space is not currently within the viewport of browser 126 ("No" path out of decision step 218), then plug-in rendering engine 132 waits for a view change event (step 220). In JavaScript view change events include onScroll and onResize events. These view change events are typically used to adjust the position of an advertisement within the browser's viewport. In the present invention these view change events are also used to control the rotation of advertisements so that the advertisements rotate when the advertisements are within the browser's viewport and do not rotate when the advertisements are not within the browser's viewport. When plug-in rendering engine 132 determines that the advertisement space is within the viewport of browser 126 ("Yes" path out of decision step 218), plug-in rendering engine 132 selects the first advertisement in the queue (step 222) and provides it to web page rendering engine 128 to reproduce the selected advertisement in the designated advertisement space (step 224).

Figure 4:
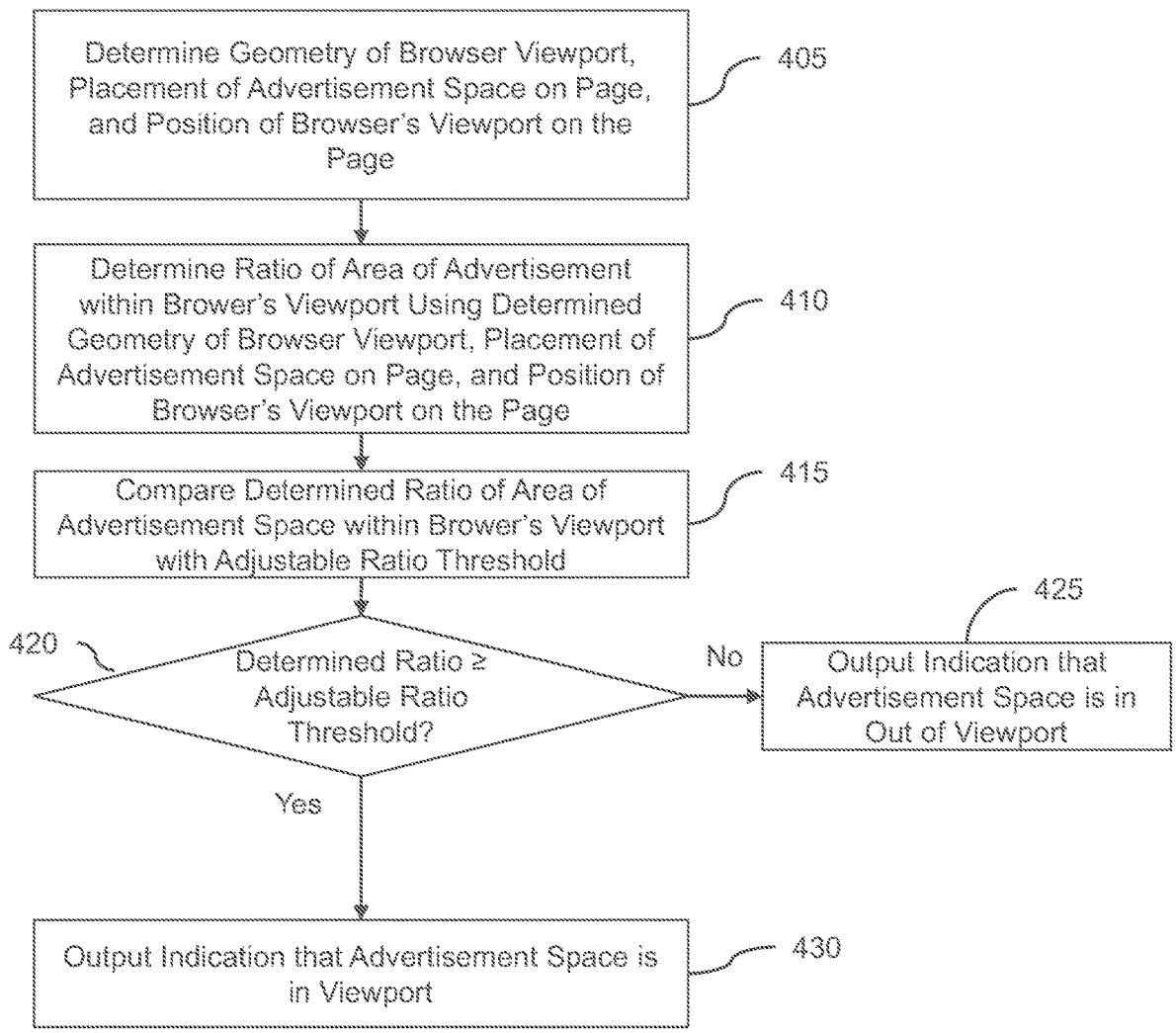
FIG. 4 is a flow diagram of an exemplary method for determining whether a selected advertisement is in a browser viewport in accordance with the present invention.

Plug-in rendering engine 132 then determines whether the advertisement space is within the viewport (step 226). The present invention can be implemented so that this determination can be satisfied based upon a predetermined amount of the advertisement space being within the viewport, as illustrated in FIG. 4. Specifically, plug-in rendering engine 132 determines a geometry of the viewport of browser 126, placement of the advertisement space on the reproduced web page, and a position of the viewport of the browser 126 on the reproduced web page (step 405). Plug-in rendering engine 132 then determines a ratio of the area of the advertisement space within the viewport of browser 126 using the determined geometry of the viewport of browser 126, placement of the advertisement space on the reproduced web page, and a position of the viewport of the browser 126 on the reproduced web page (step 410). Plug-in rendering engine 132 compares this ratio with an adjustable ratio threshold (step 415) to determine whether the determined ratio is greater than or equal to the adjustable ratio threshold (step 420). When the determined ratio is less than the adjustable ratio threshold ("No" path out of decision step 420), an out of viewport indication is output (step 425). In contrast, when the determined ratio is greater than or equal to the adjustable ratio threshold ("Yes" path out of decision step 420), then an in viewport indication is output (step 430).

Figure 5A:
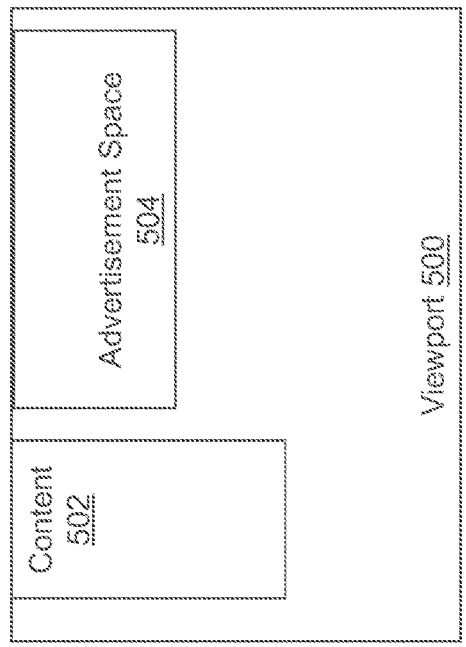
FIGS. 5A-5D are block diagrams of exemplary viewports in accordance with the present invention.
Figure 5B:
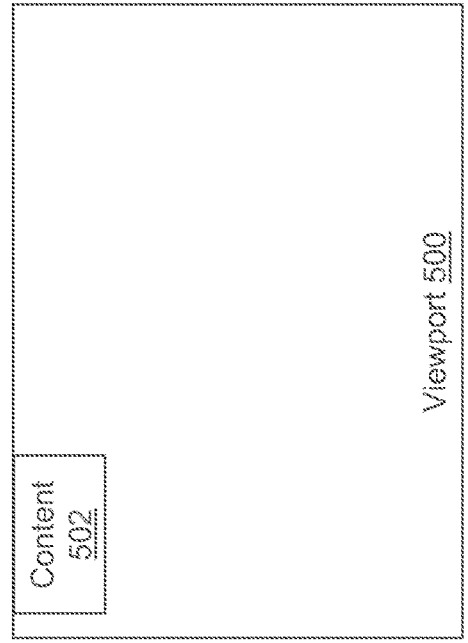
Figure 5C:
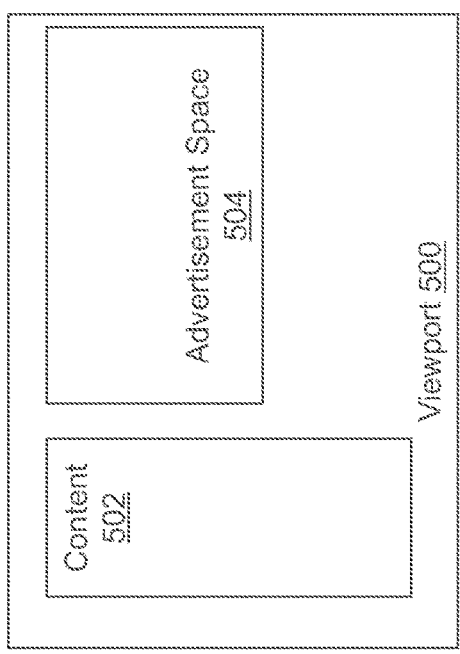
Figure 5D:
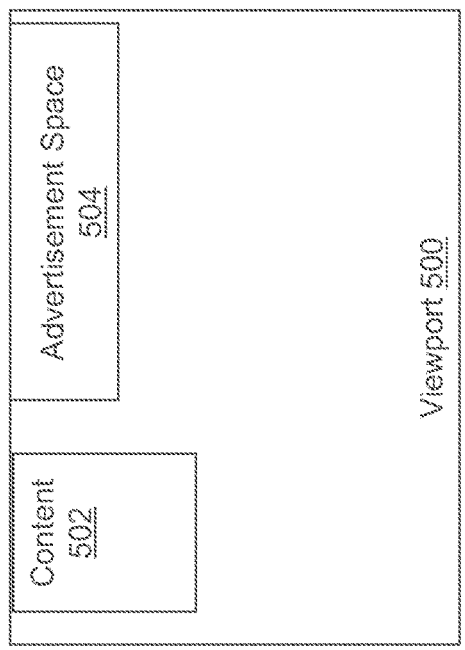

The adjustable ratio threshold can be adjusted based on any number of factors. For example, the threshold can be different for one or more of the advertisements so that an advertiser pays more for a threshold that results in more of the advertisement being within the viewport compared to a threshold that results in less of the advertisement being within the viewport. This concept will be appreciated in connection with the viewport block diagrams of FIGS. 5A-5D. Each of these figures illustrates a viewport 500 with content 502 and an advertisement space 504 that includes an advertisement. In FIG. 5A the entire advertisement space 504 is within the viewport, in FIG. 5B the web page has been scrolled so that only 75% of the advertisement space 504 is within the viewport, in FIG. 5C the web page is scrolled further so that only 25% of the advertisement space is within the viewport, and in FIG. 5D the web page is further scrolled so that none of the advertisement space 504 is within the viewport. Thus, the illustrated arrangement in FIG. 5A would result in an indication that the advertisement space is in view (step 430) and the illustrated arrangement in FIG. 5D would result in an indication that the advertisement space is out of view (step 425). Whether or not the arrangements of FIGS. 5B and 5C result in an indication that the advertisement space is in or out of view depends upon the adjustable ratio threshold.

Returning to FIG. 2B, if the result of the method of FIG. 4 is that the advertisement space is not within the viewport of the browser 126 ("No" path out of decision step 226), then the selected advertisement continues to be reproduced in the designated advertisement space until plug-in rendering engine 132 determines that a view change event has occurred (step 228).

If the result of the method of FIG. 4 is that the advertisement space is within the viewport of browser 126 ("Yes" path out of decision step 226), then plug-in rendering engine 132 determines whether the advertisement space has just come into the viewport (step 230), i.e., whether the advertisement space came into the viewport as the result of a view change event (step 228). If the advertisement space just came into the viewport ("Yes" path out of decision step 230) then plug-in rendering engine 132 waits for a predetermined amount of time (step 232) and determines then determines whether the advertisement space is still within the viewport (step 234). If plug-in rendering engine 132 determines that the advertisement space is not within the viewport after the predetermined delay ("No" path out of decision step 234), then plug-in rendering engine 132 waits for another view change event (step 228).

If the advertisement space is still within the viewport ("Yes" path out of decision step 234) or if the advertisement space did not just come into the viewport ("No" path out of decision step 230), then plug-in rendering engine 132 determines whether the reproduced advertisement is the last advertisement in the queue (step 236). When the reproduced advertisement is not the last advertisement in the queue ("No" path out of decision step 236), then plug-in rendering engine 132 selects the next advertisement in the queue (step 238) and provides it to web page rendering engine 128 to reproduce the selected advertisement in the designated advertisement space (step 224). When the reproduced advertisement is the last advertisement in the queue ("Yes" path out of decision step 236), then plug-in rendering engine 132 selects the first advertisement in the queue (step 222) and provides it to web page rendering engine 128 to reproduce the selected advertisement in the designated advertisement space (step 224).

The techniques disclosed above can be embodied in a non-transitory computer readable medium, which when executed by a processor causes the processor to perform the disclosed techniques.

Although exemplary embodiments have been describe above in connection with the use of a browser plug-in, browsers that natively have the ability to detect change events can be employed with the present invention without such a plug-in.

Although the present invention has been described above by means of embodiments with reference to the enclosed drawings, it is understood that various changes and developments can be implemented without leaving the scope of the present invention, as it is defined in the enclosed claims.

What is claimed is:

1. A method operable with a computing system, comprising:
   receiving, by a web browser being executed on a processor, code corresponding to a requested web page;
   executing, by the web browser, the received code to reproduce the requested web page;
   displaying a portion of the requested web page within a viewport of the web browser;
   executing, by a plug-in of the web browser, a plug-in script in the received code,
   wherein the execution of the plug-in script by the plug-in comprises
      selecting an advertisement from an advertisement queue;
      reproducing the selected advertisement in an advertisement space on a portion of the web page;
      determining whether the advertisement space is within the viewport of the web browser,
         whereby the advertisement space is displayed on the webpage when it is within the viewport of the web browser,
         wherein when a predetermined portion of the advertisement space is not within the viewport of the web browser, the plug-in:
            waits for a viewing area change event;
            determines whether the viewing area change event caused the predetermined portion of the advertisement space to be within the viewport of the web browser; and
            selects another advertisement from the advertisement queue when the viewing area change event caused the predetermined portion of the advertisement space to be within the viewport of the web browser;
      wherein the determination of whether the advertisement space is within the viewport of the web browser comprises:
      determining a geometry of the viewport of the web browser, a placement of the advertisement space on the web page, and a position of the viewport of the web page on the web page;
      determining a ratio of an area of the selected advertisement within the viewport of the web browser based on the determined geometry, the determined placement, and the determined position;
      comparing the determined ratio of the area of the advertisement space to a predetermined ratio.

2. The method of claim 1, wherein when the advertisement space is within the viewport of the web browser for a predetermined amount of time, the another advertisement is reproduced in the advertisement space on the portion of the web page.

3. The method of claim 1, wherein execution of the plug-in script further comprises selecting and reproducing advertisements in the advertisement space for a predetermined amount of time regardless of whether the reproduced advertisement is within the viewport of the web browser.

4. The method of claim 1, wherein the predetermined ratio is adjustable.

5. The method of claim 4, wherein the predetermined ratio is different for at least two different advertisements within the advertisement queue.

6. The method of claim 1, wherein the plug-in script is a Java script.

7. A computer, comprising:
   a memory storing a web browser and a plug-in;
   a processor, which loads the web browser and plug-in from the memory, the computer comprising instructions that, when executed by the processor, direct the processor to:
   receive code corresponding to a requested web page;
   execute the received code to reproduce the requested web page;

display a portion of the requested web page within a viewport of the web browser;
execute a plug-in script in the received code, wherein the execution of the plug-in script by the plug-in causes the processor to:
select an advertisement from an advertisement queue;
reproduce the selected advertisement in an advertisement space on a portion of the web page;
determine whether the advertisement space is within the viewport of the web browser,
whereby the advertisement space is displayed on the webpage when it is within the viewport of the web browser,
wherein when a predetermined portion of the advertisement space is not within the viewport of the web browser, the processor:
waits for a viewing area change event;
determines whether the viewing area change event caused the predetermined portion of the advertisement space to be within the viewport of the web browser; and
selects another advertisement from the advertisement queue when the viewing area change event caused the predetermined portion of the advertisement space to be within the viewport of the web browser;
wherein the processor determines whether the advertisement space is within the viewport of the web browser by:
determining a geometry of the viewport of the web browser, a placement of the advertisement space on the web page, and a position of the viewport of the web page on the web page;
determining a ratio of an area of the selected advertisement within the viewport of the web browser based on the determined geometry, the determined placement, and the determined position;
comparing the determined ratio of the area of the advertisement space to a predetermined ratio.

8. The computer of claim 7, wherein when the advertisement space is within the viewport of the web browser for a predetermined amount of time, the another advertisement is selected from the advertisement queue and reproduced on in the advertisement space on the portion of the web page.

9. The computer of claim 7, wherein execution of the plug-in script further comprises selecting and reproducing advertisements in the advertisement space for a predetermined amount of time regardless of whether the reproduced advertisement is within the viewport of the web browser.

10. The computer of claim 7, wherein the predetermined ratio is adjustable.

11. The computer of claim 10, wherein the predetermined ratio is different for at least two different advertisements within the advertisement queue.

12. The computer of claim 7, wherein the plug-in script is a Java script.

* * * * *